(12) United States Patent
Yorifuji

(10) Patent No.: US 12,358,519 B2
(45) Date of Patent: Jul. 15, 2025

(54) NOTIFICATION DEVICE AND NOTIFICATION METHOD

(71) Applicant: TOYOTA JIDOSHA KABUSHIKI KAISHA, Toyota (JP)

(72) Inventor: Yamato Yorifuji, Aichi-gun Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 17/985,194

(22) Filed: Nov. 11, 2022

(65) Prior Publication Data

US 2023/0242137 A1 Aug. 3, 2023

(30) Foreign Application Priority Data

Jan. 11, 2022 (JP) ................................ 2022-002545

(51) Int. Cl.
*B60W 50/14* (2020.01)
*B60W 40/08* (2012.01)
*G06V 20/58* (2022.01)

(52) U.S. Cl.
CPC ............ *B60W 50/14* (2013.01); *B60W 40/08* (2013.01); *G06V 20/582* (2022.01); *B60W 2050/146* (2013.01); *B60W 2420/403* (2013.01); *B60W 2552/53* (2020.02)

(58) Field of Classification Search
CPC ........... B60W 50/14; B60W 2420/403; B60W 2555/60; B60W 2050/146; B60W 2050/143; B60W 2552/00–53; B60W 50/00–16; B60W 40/00–13; B60W 2040/0809–1392; G08G 1/09623; G06V 20/588; G06V 20/582; B60K 28/00–165; G05D 1/0061; G05D 1/0088; G05D 1/021; G05D 1/0214; G05D 1/0221; G05D 1/0223

See application file for complete search history.

(56) References Cited

U.S. PATENT DOCUMENTS

2017/0073006 A1* 3/2017 Satomura ............... B60W 50/14
2024/0290202 A1* 8/2024 Yedla ....................... G08G 1/04

FOREIGN PATENT DOCUMENTS

| JP | 2006213162 A | * | 8/2006 | |
| JP | 2018-088188 A | | 6/2018 | |
| JP | 2019-212188 A | | 12/2019 | |
| KR | 10-2021-0081887 A | | 7/2021 | |
| WO | WO-2019222358 A1 | * | 11/2019 | ......... G01C 21/3407 |

* cited by examiner

*Primary Examiner* — Hitesh Patel
*Assistant Examiner* — Elle Rose Knudson
(74) *Attorney, Agent, or Firm* — Dinsmore & Shohl LLP

(57) ABSTRACT

A notification device is applied to a vehicle including one or more cameras that captures an image of at least an area forward of the vehicle and an human machine interface device that performs notification to alert a driver of the vehicle. The notification device includes a processor. The processor controls the human machine interface device such that the human machine interface device notifies the driver that a u-turn is not allowed when the one or more cameras detects a no u-turn sign forward of the vehicle and the one or more cameras detects a right-turn road surface marking in a travel lane of the vehicle.

15 Claims, 6 Drawing Sheets

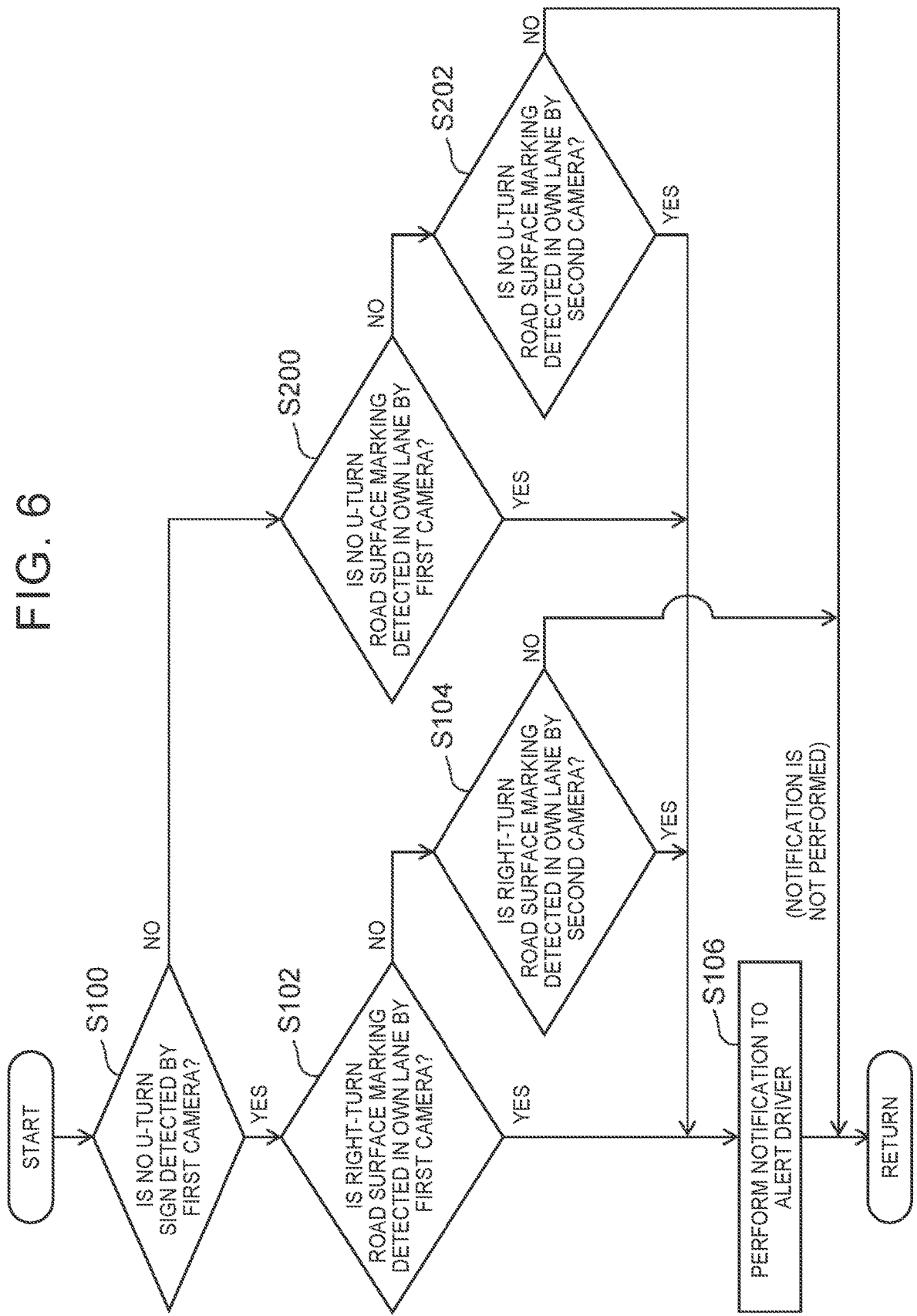

NOTIFICATION DEVICE AND NOTIFICATION METHOD

CROSS-REFERENCE TO RELATED APPLICATION

This application claims priority to Japanese Patent Application No. 2022-002545 filed on Jan. 11, 2022, incorporated herein by reference in its entirety.

BACKGROUND

1. Technical Field

The present disclosure relates to a notification device applied to a vehicle and a notification method.

2. Description of Related Art

Japanese Unexamined Patent Application Publication No. 2018-088188 (JP 2018-088188 A) discloses a driver assistance device. This driver assistance device detects a regulatory sign indicating that entry of an own vehicle is regulated by an on-board camera. When the own vehicle shows a behavior in which the own vehicle moves toward a regulatory lane where progress is regulated by the regulatory sign, the driver assistance device suppresses the behavior or warns the driver by using a device such as a display. Further, a no u-turn sign is described as an example of the regulatory sign.

Japanese Unexamined Patent Application Publication No. 2019-212188 (JP 2019-212188 A) discloses a technique for notifying a driver of a road sign recognized by a camera with a notification unit such as a monitor device.

SUMMARY

If a driver is notified every time a no u-turn sign is detected by a camera, unnecessary notification may be performed even though a vehicle is actually traveling on a lane where u-turn is not allowed, such as a straight-ahead lane.

The present disclosure is made in view of the above-mentioned problems, and an object of the present disclosure is to notify the driver that the u-turn is not allowed by targeting an appropriate scene.

A notification device according to the present disclosure is applied to a vehicle including one or more cameras that captures an image of at least an area forward of the vehicle, and a human machine interface device that performs notification to alert a driver of the vehicle. The notification device includes a processor. The processor controls the human machine interface device such that the human machine interface device notifies the driver that u-turn is not allowed when the one or more cameras detects a no u-turn sign forward of the vehicle and the one or more cameras detects a right-turn road surface marking in a travel lane of the vehicle.

The one or more cameras may include a first camera and a second camera that is able to capture an image of a road surface region closer to the vehicle than a road surface region of which an image is captured by the first camera. The processor may execute a process of detecting the right-turn road surface marking by the second camera after detecting the no u-turn sign by the first camera.

The processor may control the human machine interface device such that the human machine interface device notifies the driver that the u-turn is not allowed when the one or more cameras detects a no u-turn road surface marking in the travel lane of the vehicle even though the no u-turn sign is not detected.

A notification method according to the present disclosure is applied to a vehicle including one or more cameras that capture an image of at least an area forward of the vehicle and a human machine interface device that performs notification to alert a driver of the vehicle. The notification method includes controlling the human machine interface device such that the human machine interface device notifies the driver that u-turn is not allowed when the one or more cameras detects a no u-turn sign forward of the vehicle and the one or more cameras detects a right-turn road surface marking in a travel lane of the vehicle.

According to the present disclosure, the driver is notified that the u-turn is not allowed only when the right-turn road surface marking is detected in the travel lane of the vehicle, in other words, the vehicle travels on a right-turn lane. This suppresses unnecessary notification and allows notification by targeting an appropriate scene.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart showing a process related to safe driving assistance according to a second modification of the embodiment.

DETAILED DESCRIPTION OF EMBODIMENTS

An embodiment of the present disclosure will be described below with reference to the accompanying drawings. However, when the number, quantity, amount, range, etc. of each element are referred to in the embodiment shown below, the technical idea of the present disclosure is not limited to the numbers mentioned herein except when explicitly stated or when clearly specified by the number in principle.

1. Vehicle Configuration Example

Figure 1:
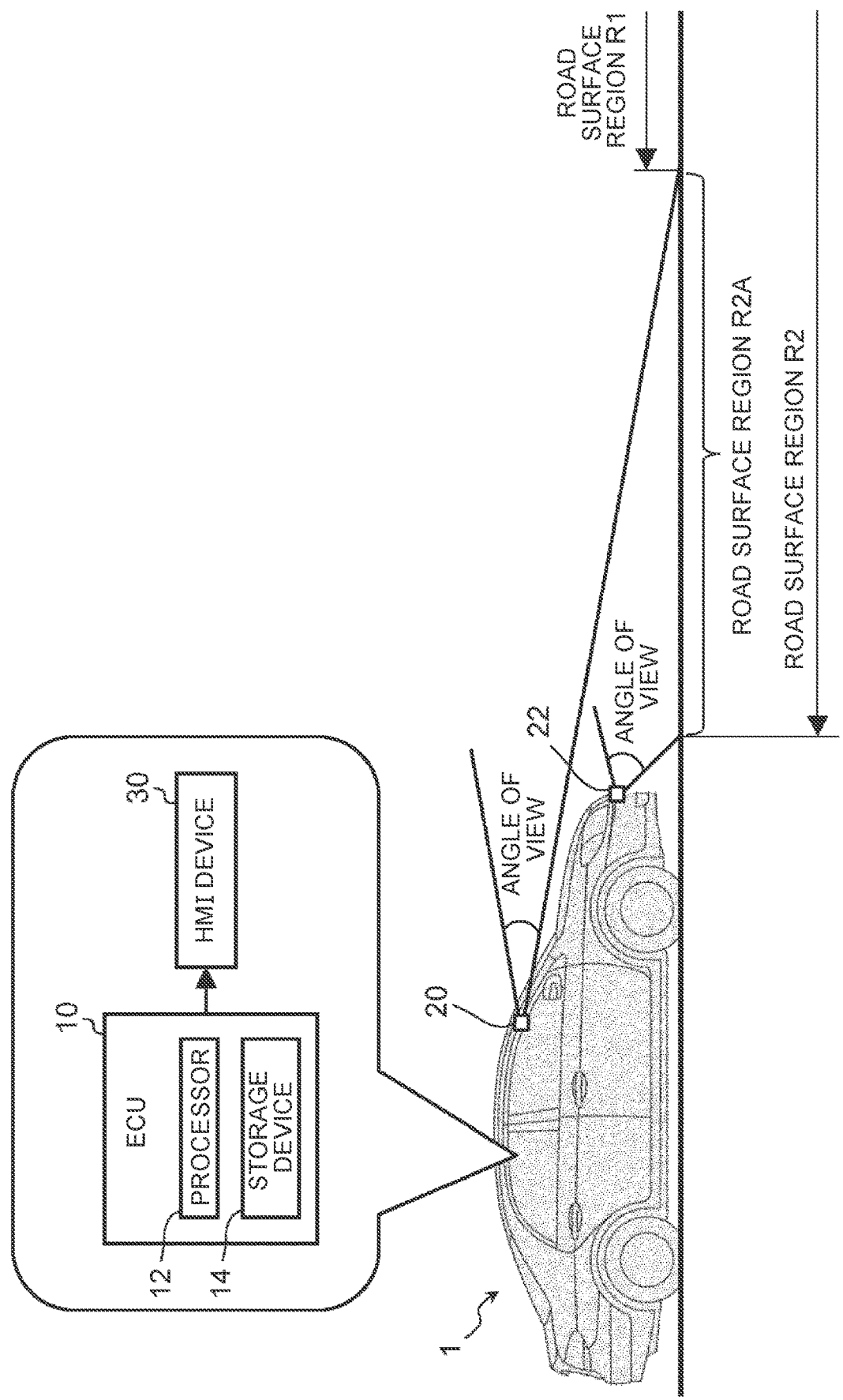
FIG. 1 is a diagram schematically showing an example of a configuration of a vehicle according to an embodiment.

FIG. 1 is a diagram schematically showing an example of a configuration of a vehicle 1 according to an embodiment. The vehicle 1 includes an electronic control unit (ECU) 10, a first camera 20, a second camera 22, and a human machine interface (HMI) device 30.

The ECU 10 is a computer that controls the vehicle 1. The ECU 10 includes one or more processors (hereinafter simply referred to as a processor) 12 and one or more storage devices (hereinafter simply referred to as a storage device) 14. The processor 12 executes various processes. For example, the processor 12 includes a central processing unit (CPU). The storage device 14 stores various kinds of information necessary for processing by the processor 12. Examples of the storage device 14 include a volatile memory, a non-volatile memory, a hard disk drive (HDD), and a solid state drive (SSD). The processor 12 executes various programs, so that various processes by the processor 12 are realized. The various programs are stored in the storage device 14. A plurality of the ECUs 10 may be provided.

The first camera 20 and the second camera 22 each capture an image of an area forward of the vehicle 1. Each of the "first camera" and the "second camera" according to the present disclosure may capture the image of the at least area forward of the vehicle, and may also capture images of areas in other directions (for example, side areas) in addition to the area forward of the vehicle 1.

The first camera 20 is mounted, for example, on the vehicle 1 to recognize various targets such as road signs (for example, a no u-turn sign 54 shown in FIG. 2), vehicles forward of the vehicle 1 (a preceding vehicle, an oncoming vehicle, etc.), and pedestrians. The first camera 20 is installed, for example, in a vehicle cabin of the vehicle 1 (for example, on a back side of an inner mirror), and captures the image of the area forward of the vehicle 1 through a windshield. The "first camera" according to the present disclosure may be mounted on a roof of the vehicle 1, for example.

The second camera 22 is one of a plurality of cameras, for example. Each of the cameras is disposed on the front, the rear, the right, or the left of the vehicle 1 for the basic purpose of assisting the driver in confirming the surroundings of the vehicle 1 when the vehicle 1 travels at a low speed, such as when the driver parks and starts the vehicle. The second camera 22 is, for example, a wide-angle fisheye camera, and is installed on a front bumper. The "second camera" according to the present disclosure may be, for example, at least one of two cameras disposed on the right and left sides of the vehicle 1 (for example, the lower side of the door mirror for rearward confirmation) for the above purpose.

The second camera 22 is disposed below the first camera 20 in a vertical direction. In addition, the second camera 22 has an angle of view in which an image of the lower side than the image of the area captured by the first camera 20 can be captured. Therefore, as shown in FIG. 1, a road surface region R2 of which the image captured by the second camera 22 includes a road surface region R2A closer to the vehicle 1 than a road surface region R1 of which the image captured by the first camera 20.

The HMI device 30 has a function of performing notification to alert the driver of the vehicle 1. The HMI device 30 includes, for example, a display for visually alerting the driver. The display is, for example, a display mounted on an instrument panel of the vehicle 1 or a head-up display (HUD) that displays information on the windshield of the vehicle 1. Further, the HMI device 30 may include one or both of a buzzer and a speaker for aurally alerting the driver instead of or in addition to the display.

The HMI device 30 is controlled by the ECU 10 (processor 12). A "notification device" according to the present disclosure is, as an example, configured to include the processor 12, the first camera 20, the second camera 22, and the HMI device 30.

2. Safe Driving Assistance

Figure 2:
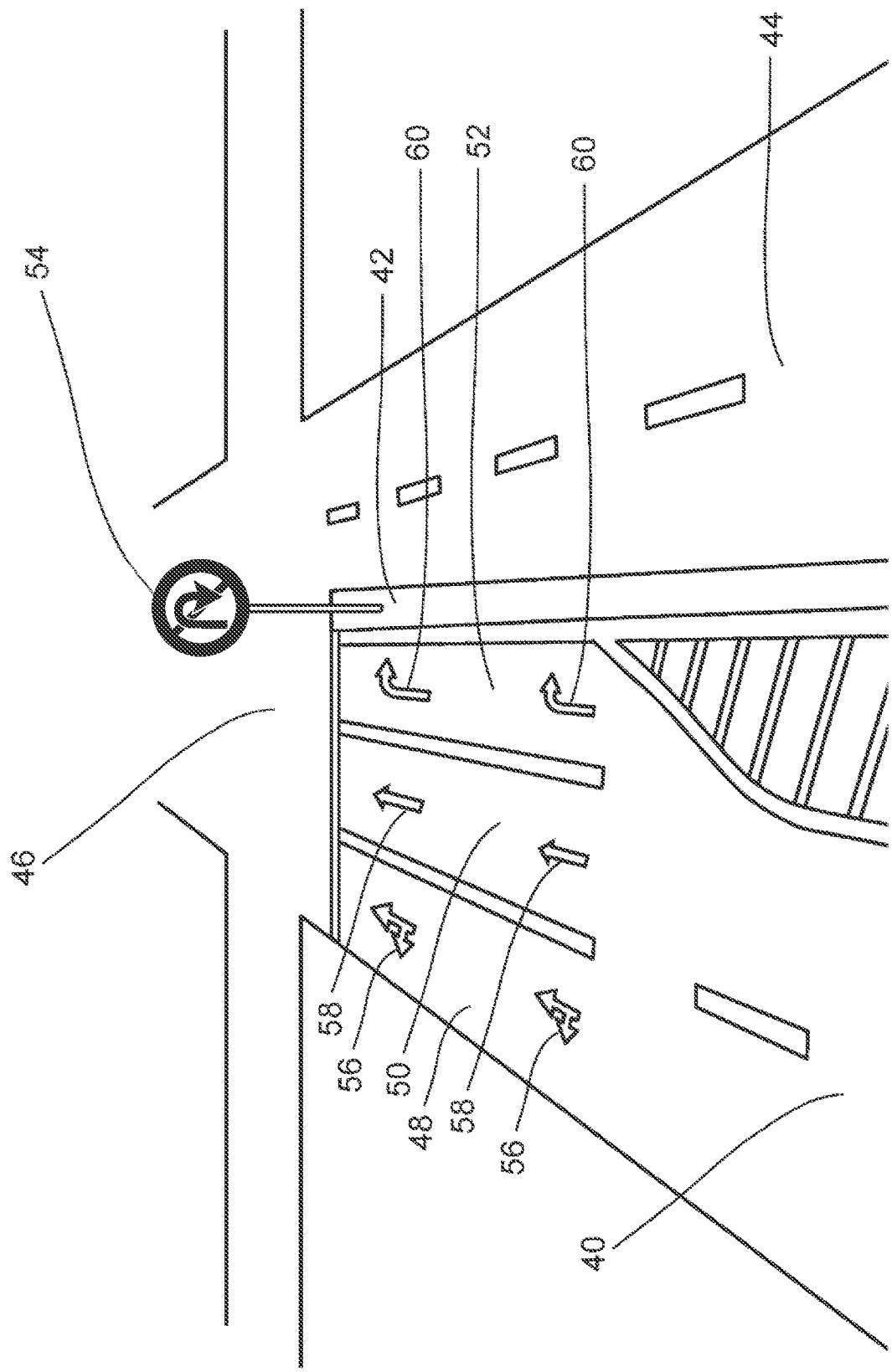
FIG. 2 is a diagram showing an example of an intersection where the vehicle is approaching.

FIG. 2 is a diagram showing an example of an intersection where the vehicle 1 is approaching. FIG. 2 shows a travel path 40 on which the vehicle 1 travels and an oncoming path 44 that faces the travel path 40 through a median strip 42. As an example, the travel path 40 has two lanes, and near an intersection 46, the travel path 40 has a straight-ahead and left-turn lane 48, a straight-ahead lane 50, and a right-turn lane 52.

A no u-turn sign 54 is installed on the median strip 42 near the intersection 46. In addition, on the lanes 48, 50, and 52 near the intersection 46, road surface markings 56, 58, and 60 are applied as road surface markings (arrow markings indicating possible directions of travel) applied on a road surface, respectively.

As one of the safe driving assistance measures for the vehicle 1, the processor 12 performs notification to alert the driver that the u-turn is not allowed at the intersection 46. It is considered that such notification is performed every time the camera detects the no u-turn sign 54. However, according to such a method, there is a possibility that unnecessary notification may be performed even though the vehicle 1 is actually traveling on a lane where the u-turn is not allowed, such as the straight-ahead lane 50.

Therefore, in the present embodiment, the processor 12 notifies the driver that the u-turn is not allowed when the no u-turn sign 54 forward of vehicle 1 is detected, and the right-turn road surface marking 60 is detected in the travel lane of the vehicle 1. Here, when such a method is adopted while only the first camera 20 for the detecting the no u-turn sign 54 and the road surface marking 60 is used, there are additional issues as follows.

That is, the first camera 20 has an angle of view suitable for recognizing the above-described various targets including the road signs such as the no u-turn sign 54, the vehicles forward of the vehicle 1, and the pedestrians, and is mounted in a position suitable for recognizing the above-described various targets. Therefore, when the right-turn road surface marking 60 is within the road surface region R1 (see FIG. 1) of the first camera 20 and the road surface marking 60 is blocked by the preceding vehicle, the road surface marking 60 may be out of the angle of view of the first camera 20 even though the preceding vehicle is away from the road surface marking 60 when the vehicle 1 further approaches the road surface marking 60 later. In other words, the first camera 20 may not be able to detect the right-turn road surface marking 60.

Therefore, in the present embodiment, the processor 12 is configured to execute a process of detecting the right-turn road surface marking 60 by the second camera 22 after detecting the no u-turn sign 54 by the first camera 20.

Figure 3:
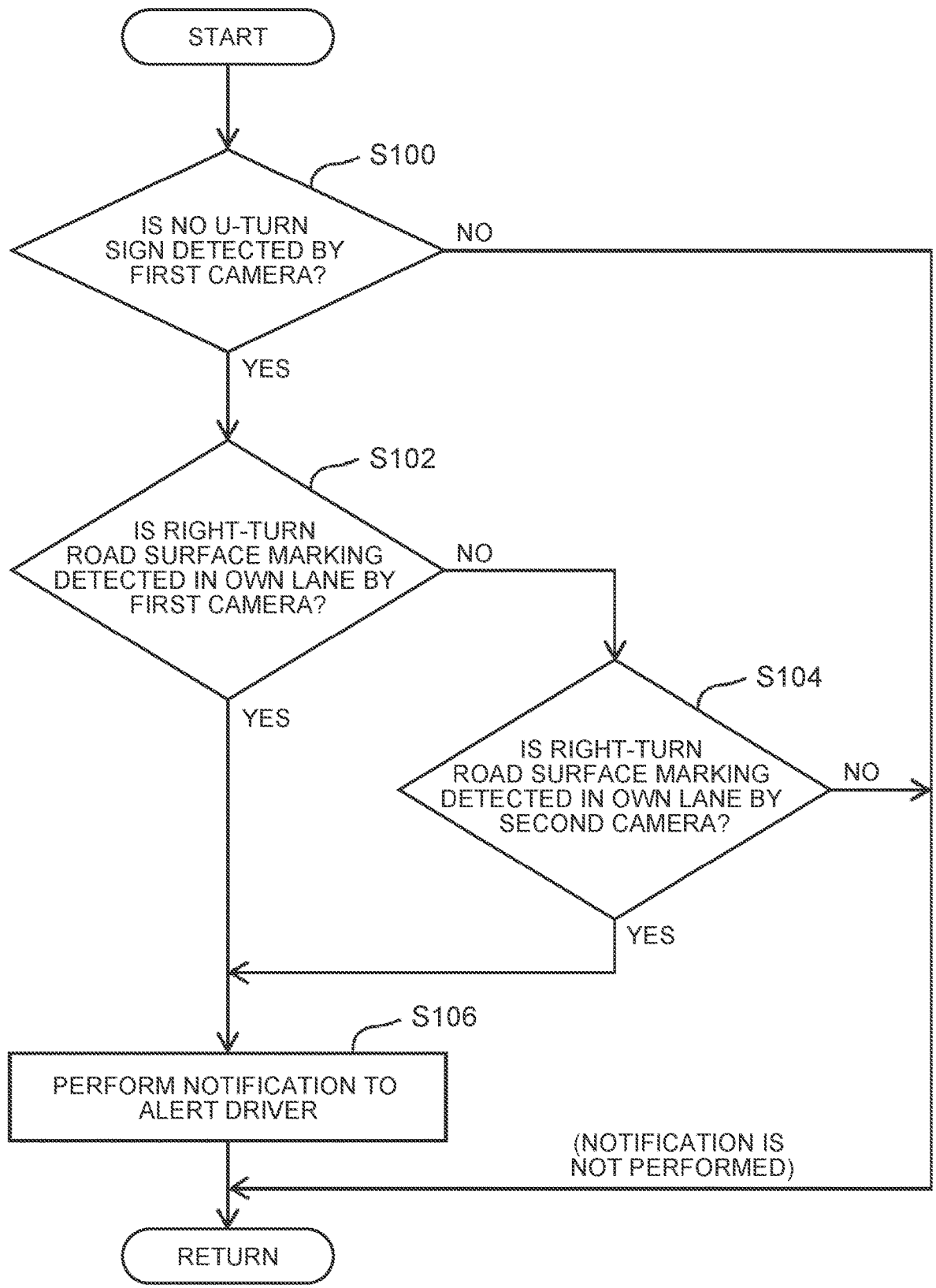
FIG. 3 is a flowchart showing a process related to safe driving assistance according to the embodiment.

FIG. 3 is a flowchart showing a process related to safe driving assistance according to the embodiment. The process of this flowchart is repeatedly executed while the vehicle 1 is traveling.

In FIG. 3, the ECU 10 (processor 12) determines in step S100 whether the no u-turn sign 54 is detected by image recognition using the first camera 20. As a result, when the no u-turn sign 54 is not detected, the process proceeds to return.

On the other hand, when the no u-turn sign 54 is detected in step S100, the process proceeds to step S102. In step S102, the processor 12 determines whether the right-turn road surface marking 60 is detected in an own lane (lane on which the vehicle 1 is traveling) by image recognition using the first camera 20. The detection of the right-turn road surface marking 60 in the own lane can be made, for example, as follows. That is, the processor 12 detects the white lines on the right and left sides of the vehicle 1 by the first camera 20, recognizes the own lane using the detected white lines on the right and left sides of the vehicle 1, and detects the right-turn road surface marking 60 that is present in the recognized own lane.

When the determination result in step S102 is Yes (that is, when the right-turn road surface marking 60 is detected in the own lane by the first camera 20), the process proceeds to step S106. On the other hand, when the determination result is No (that is, when the right-turn road surface marking 60 is not detected in the own lane by the first camera 20), the process proceeds to step S104.

In step S104, the processor 12 determines whether the right-turn road surface marking 60 is detected in the own lane by image recognition using the second camera 22. Even when the second camera 22 is used, the detection of the right-turn road surface marking 60 in the own lane can be made, for example, by the method described above.

When the determination result in step S104 is No (that is, when neither the first camera 20 nor the second camera 22 detects the right-turn road surface marking 60 in the own lane), the process proceeds to return. When the vehicle 1 is traveling in a travel lane other than the right-turn lane 52 (in the example shown in FIG. 2, the straight-ahead and left-turn lane 48 or the straight-ahead lane 50), the right-turn road surface marking 60 is not detected in the own lane. When the vehicle 1 is traveling in a travel lane other than the right-turn lane 52, it can be determined that there is no or at least a low possibility that the u-turn is made. Therefore, when the determination result in step S104 is No, notification by the HMI device 30 is not performed even though the no u-turn sign 54 is detected. As a result, it is possible to suppress the driver from feeling annoyed by excessive notification.

On the other hand, when the determination result in step S104 is Yes (that is, when the right-turn road surface marking 60 is detected in the own lane by the second camera 22), the process proceeds to step S106.

As described above, the process proceeds to step S106 when the first camera 20 or the second camera 22 detects the right-turn road surface marking 60 in the own lane, that is, when it is determined that the vehicle 1 is traveling in the right-turn lane 52. In such a case, it can be determined that there is a possibility that the u-turn is made. Therefore, in step S106, the processor 12 controls the HMI device 30 such that the HMI device 30 performs notification to alert the driver that the u-turn is not allowed.

3. Effects

As described above, according to the present embodiment, the notification to the driver that the u-turn is not allowed is performed when not only the detection of the no u-turn sign 54 is made, but also the detection of the right-turn road surface marking 60 in the travel lane of the vehicle 1 is made. Therefore, the notification is performed only when the right-turn road surface marking 60 is detected in the travel lane of vehicle 1, in other words, only when the vehicle 1 is traveling in the right-turn lane 52. This suppresses unnecessary notification and allows notification by targeting an appropriate scene.

In addition, according to the present embodiment, for the detection of the right-turn road surface marking 60, not only the first camera 20 but also the second camera 22 is used as necessary. The second camera 22 can capture the image of the road surface region R2A closer to the vehicle 1 than the road surface region R1 of which the image captured by the first camera 20 (see FIG. 1). Therefore, even when the right-turn road surface marking 60 cannot be detected by the first camera 20 because of the presence of the preceding vehicle when the vehicle 1 (own vehicle) is approaching the road surface marking 60, the road surface marking 60 can be detected by the second camera 22 while the vehicle 1 is close to the road surface marking 60. Therefore, as compared with the example in which only the first camera 20 is used to detect the road surface marking 60, the right-turn road surface marking 60 can be detected more reliably.

4. First Modification

In the above configuration, the second camera 22 is used along with the first camera 20 to detect the right-turn road surface marking 60. However, the detection of the right-turn road surface marking 60 for determining whether the driver should be notified that the u-turn is not allowed according to the present disclosure may not be necessarily made using both the first camera 20 and the second camera 22, as in a first modification to be described below.

Figure 4:
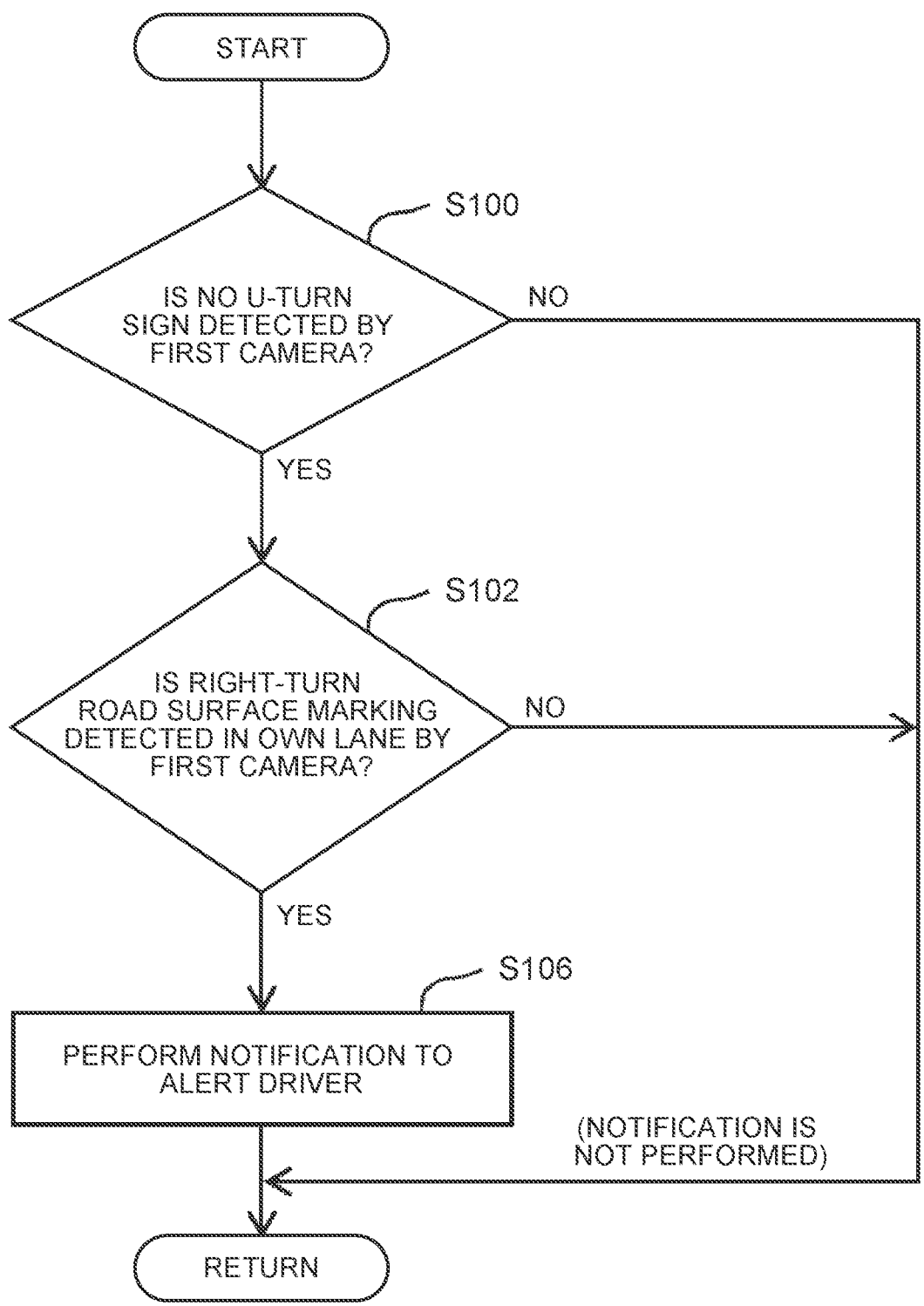
FIG. 4 is a flowchart showing a process related to safe driving assistance according to a first modification of the embodiment.

FIG. 4 is a flowchart showing a process related to safe driving assistance according to the first modification of the embodiment. The process in this flowchart is the same as that in the flowchart shown in FIG. 3, except that the process in step S104 is omitted. That is, according to the process shown in FIG. 4, the detection of the right-turn road surface marking 60 is made using only the first camera 20. As described in the first modification, the detection of the right-turn road surface marking 60 may be made using only the first camera 20 used to detect the no u-turn sign 54.

5. Second Modification

In the above embodiment, when the no u-turn sign 54 is not detected, the driver is not notified that the u-turn is not allowed. Here, it may be difficult to detect (recognize) the no u-turn sign 54 due to obstructions such as trees or backlighting from the sun, for example. Therefore, the notification that the u-turn is not allowed may be performed as follows.

Figure 5:
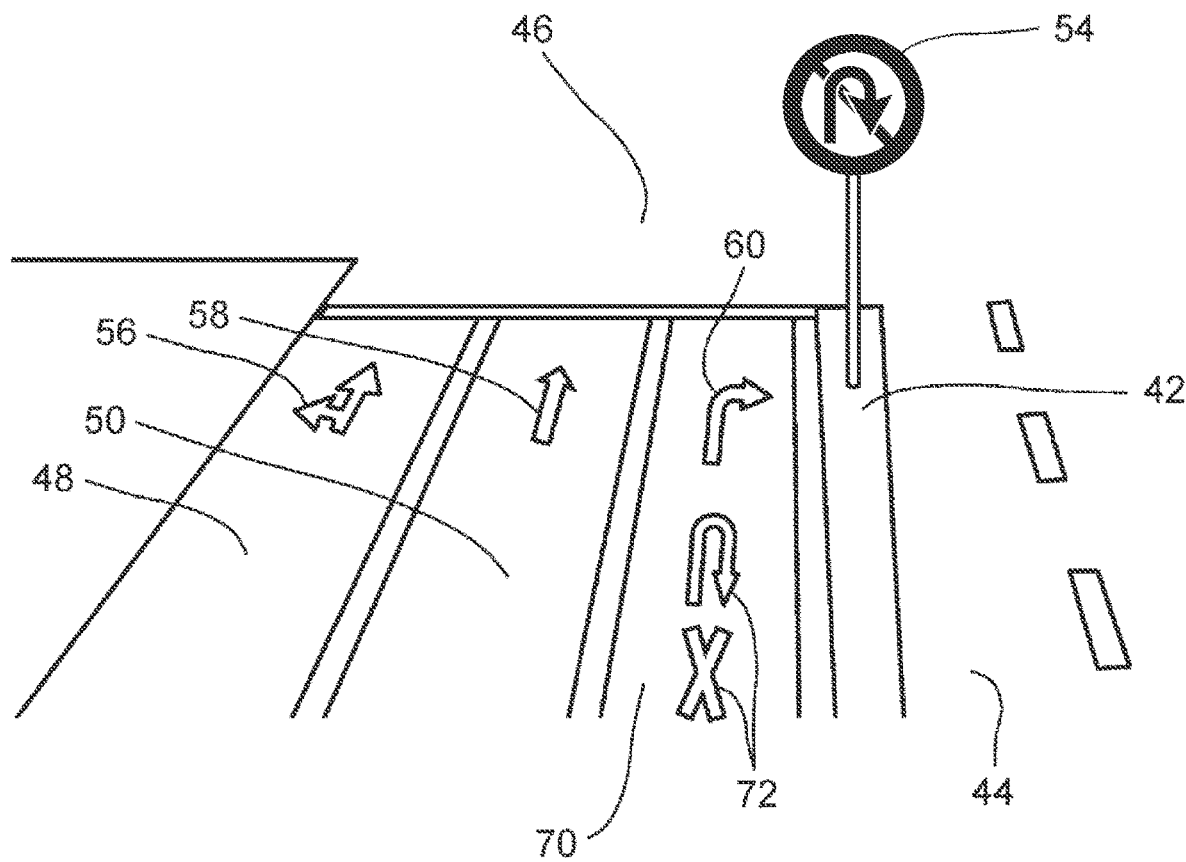
FIG. 5 is a diagram showing an example of a right-turn lane on which a no u-turn road surface marking is applied.

FIG. 5 is a diagram showing an example of a right-turn lane on which a no u-turn road surface marking 72 is applied. The no u-turn road surface marking 72 along with the right-turn road surface marking 60 are applied on the right-turn lane 70 shown in FIG. 5. In a second modification, the processor 12 controls the HMI device 30 such that the HMI device 30 notifies the driver that the u-turn is not allowed when the first camera 20 or the second camera 22 detects the no u-turn road surface marking 72 in the travel lane of the vehicle 1 even though the no u-turn sign 54 is not detected.

FIG. 6 is a flowchart showing a process related to safe driving assistance according to the second modification of the embodiment. The process in this flowchart is the same as that in the flowchart shown in FIG. 3, except that the processes in step S200 and step S202 are added.

In FIG. 6, when the determination result in step S100 is No (that is, when the no u-turn sign 54 is not detected), the process proceeds to step S200. In step S200, the processor 12 determines whether the no u-turn road surface marking 72 is detected in the own lane by image recognition using the first camera 20. The detection of the no u-turn road surface marking 72 in the own lane can be made in the same manner, for example, using the method described above for detecting the right-turn road surface marking 60 in the own lane.

When the determination result in step S200 is Yes (that is, when the no u-turn road surface marking 72 is detected in the own lane by the first camera 20), the process proceeds to step S106. On the other hand, when the determination result is No (that is, when the no u-turn road surface marking 72 is not detected in the own lane by the first camera 20), the process proceeds to step S202.

In step S202, the processor 12 determines whether the no u-turn road surface marking 72 is detected in the own lane by image recognition using the second camera 22. Even when the second camera 22 is used, the detection of the no u-turn road surface marking 72 in the own lane can be made, for example, by the method described above.

When the determination result in step S202 is No (that is, when neither the first camera 20 nor the second camera 22 detects the no u-turn road surface marking 72 in the own lane), the process proceeds to return. That is, the notification is not performed by the HMI device 30.

On the other hand, when the determination result in step S202 is Yes (that is, when the no u-turn road surface marking 72 is detected in the own lane by the second camera 22), the process proceeds to step S106.

As described above, according to the process shown in FIG. 6, not only when the determination result in step S102 or step S104 is Yes, but also when the determination result in step S200 or step S202 is "Yes," the process proceeds to step S106, and the notification is performed by the HMI device 30. As a result, the notification can be performed in a case where it can be determined that the vehicle 1 is traveling in the lane where the u-turn is not allowed using the detection of the no u-turn road surface marking 72 applied on the road surface although the no u-turn sign 54 cannot be detected due to obstructions and the like. This can increase the chances for notification in an appropriate scene at which the notification should be performed.

The detection of the no u-turn road surface marking 72 may be made using only the first camera 20, for example. That is, the process of step S200 may be performed in combination with the process in the flowchart shown in FIG. 4.

In addition, the above embodiment (and the first and second modifications) has been described for countries or regions where a vehicle travels on the left side of a road, such as Japan. However, each of the "notification device" and the "notification method" according to the present disclosure can be applied in the same manner for a vehicle traveling in countries or regions where right-side driving is required. Specifically, when the "notification device" or the "notification method" is applied to a vehicle traveling in countries or regions where right-side driving is required, "right-turn" in the above description may be read as "left-turn". The present disclosure can be applied to autonomous driving of an autonomous driving vehicle.

What is claimed is:

1. A vehicle comprising:
    a first camera and a second camera are each configured to capture an image of at least an area forward of the vehicle to include a right-turn road surface marking in a travel lane of the vehicle, the second camera being disposed below the first camera in a vertical direction such that the second camera having an angle of view in which the image is of a lower side than the image of the area captured by the first camera;
    an electronic control unit configured to determine whether the image captured by the first camera includes the right-turn road surface marking in the travel lane of the vehicle, when the image captured by the first camera does not include the right-turn road surface marking in the travel lane of the vehicle, the electronic control unit automatically initiates the second camera to capture the image; and
    a human machine interface device that performs notification to alert a driver of the vehicle, wherein the electronic control unit controls the human machine interface device such that the human machine interface device notifies the driver that u-turn is not allowed when the electronic control unit detects a no u-turn sign forward of the vehicle and the electronic control unit detects the right-turn road surface marking in the travel lane of the vehicle via image recognition from the image captured by the first camera or the second camera.

2. The notification device according to claim 1, wherein the electronic control unit controls the human machine interface device such that the human machine interface device notifies the driver that the u-turn is not allowed when the electronic control unit detects a no u-turn road surface marking in the travel lane of the vehicle even though the no u-turn sign is not detected.

3. The vehicle according to claim 1, wherein the first camera is installed in a vehicle cabin of the vehicle to capture the image of the area forward of the vehicle through a windshield.

4. The vehicle according to claim 3, wherein the first camera is configured to capture the image to include at least one of a road sign, a vehicle forward of the vehicle, or a pedestrian.

5. The vehicle according to claim 1, wherein the first camera is mounted to a roof of the vehicle to capture the image of the area forward of the vehicle.

6. The vehicle according to claim 1, wherein the second camera is a plurality of cameras that may each be disposed on a front, a rear, a right side, or a left side of the vehicle.

7. The vehicle according to claim 1, wherein the second camera is a wide-angle fisheye camera, and is installed on a front bumper of the vehicle.

8. The vehicle according to claim 1, wherein the second camera is at least one of two cameras disposed on a right side and on a left side of the vehicle.

9. A notification method that is applied to a vehicle including a first camera and a second camera each configured to capture an image of at least an area forward of the vehicle to include a right-turn road surface marking in a travel lane of the vehicle, the second camera being disposed below the first camera in a vertical direction such that the second camera having an angle of view in which the image is of a lower side than the image of the area captured by the first camera, an electronic control unit configured to determine whether the image captured by the first camera includes the right-turn road surface marking in the travel lane of the vehicle, when the image captured by the first camera does not include the right-turn road surface marking in the travel lane of the vehicle, the electronic control unit automatically initiates the second camera to capture the image, and a human machine interface device that performs notification to alert a driver of the vehicle, the notification method comprising controlling the human machine interface device such that the human machine interface device notifies the driver that a u-turn is not allowed when the electronic control unit detects a no u-turn sign forward of the vehicle and the electronic control unit detects the right-turn road surface marking in the travel lane of the vehicle via image recognition from the image captured by the first camera or the second camera.

10. The notification method according to claim 9, wherein the first camera is installed in a vehicle cabin of the vehicle to capture the image of the area forward of the vehicle through a windshield.

11. The notification method according to claim 10, wherein the first camera is configured to capture the image to include at least one of a road sign, a vehicle forward of the vehicle, or a pedestrian.

12. The notification method according to claim 9, wherein the first camera is mounted to a roof of the vehicle to capture the image of the area forward of the vehicle.

13. The notification method according to claim 9, wherein the second camera is a plurality of cameras that may each be disposed on a front, a rear, a right side, or a left side of the vehicle.

14. The notification method according to claim 9, wherein the second camera is a wide-angle fisheye camera, and is installed on a front bumper of the vehicle.

15. The notification method according to claim 9, wherein the second camera is at least one of two cameras disposed on a right side and on a left side of the vehicle.

\* \* \* \* \*